(12) United States Patent
McCabe et al.

(10) Patent No.: US 8,949,706 B2
(45) Date of Patent: Feb. 3, 2015

(54) SYSTEMS AND METHODS FOR DISTRIBUTED ELECTRONIC SIGNATURE DOCUMENTS

(75) Inventors: Andrew David McCabe, Indianola, WA (US); Thomas H. Gonser, Bellevue, WA (US)

(73) Assignee: DocuSign, Inc., Seattle, WA (US)

( * ) Notice: Subject to any disclaimer, the term of this patent is extended or adjusted under 35 U.S.C. 154(b) by 1142 days.

(21) Appl. No.: 12/176,265

(22) Filed: Jul. 18, 2008

(65) Prior Publication Data

US 2009/0024912 A1 Jan. 22, 2009

Related U.S. Application Data

(60) Provisional application No. 60/950,563, filed on Jul. 18, 2007.

(51) Int. Cl.
*G06F 17/00* (2006.01)
*G06Q 10/10* (2012.01)

(52) U.S. Cl.
CPC .................................... *G06Q 10/10* (2013.01)
USPC ............ 715/225; 715/234; 713/179; 713/180

(58) Field of Classification Search
CPC .................................................. G06F 17/243
USPC .......... 713/176, 179, 180, 168; 715/234, 225; 709/206; 705/50, 64, 67
See application file for complete search history.

(56) References Cited

U.S. PATENT DOCUMENTS

| | | |
|---|---|---|
| 5,040,142 A | 8/1991 | Mori et al. |
| 5,220,675 A | 6/1993 | Padawer et al. |
| 5,222,138 A | 6/1993 | Balabon et al. |
| 5,337,360 A | 8/1994 | Fischer |
| 5,390,247 A | 2/1995 | Fischer |
| 5,465,299 A | 11/1995 | Matsumoto et al. |
| 5,544,255 A | 8/1996 | Smithies et al. |
| 5,553,145 A | 9/1996 | Micali |

(Continued)

FOREIGN PATENT DOCUMENTS

| | | | |
|---|---|---|---|
| CN | 101299256 | 11/2008 | |
| EP | 1238321 B1 * | 9/2002 | ............... G06F 1/00 |

(Continued)

OTHER PUBLICATIONS

Wheeler et al., "DocuSign Unveils new Scalable Product and Support Offerings of Electronic Signature and Electronic Contract Execution," DocuSign the fastest way to get a signature, 2 pp., Jan. 2008.

(Continued)

*Primary Examiner* — Cesar Paula
*Assistant Examiner* — Howard Cortes
(74) *Attorney, Agent, or Firm* — Lowe Graham Jones PLLC

(57) ABSTRACT

Systems and methods for distributed electronic signature documents. A method for distributed electronic signature documents includes creating a signing template that contains information about how a signable document is to be signed. A signable document is created to be distributed to a signer for signing. The signable document is electronically transmitted to the signer. A message is sent using an activatable control in the signing document to a web signing server to invoke the signing process. A browser window is opened on a signer's computer in order to execute the signing process.

19 Claims, 2 Drawing Sheets

(56) References Cited

U.S. PATENT DOCUMENTS

| | | |
|---|---|---|
| 5,615,268 A | 3/1997 | Bisbee et al. |
| 5,629,982 A | 5/1997 | Micali |
| 5,689,567 A | 11/1997 | Miyauchi |
| 5,748,738 A | 5/1998 | Bisbee et al. |
| 5,813,009 A | 9/1998 | Johnson et al. |
| 5,832,499 A | 11/1998 | Gustman |
| 5,872,848 A | 2/1999 | Romney et al. |
| 5,898,156 A | 4/1999 | Wilfong |
| 6,021,202 A | 2/2000 | Anderson et al. |
| 6,067,531 A | 5/2000 | Hoyt et al. |
| 6,085,322 A | 7/2000 | Romney et al. |
| 6,092,080 A | 7/2000 | Gustman |
| 6,119,229 A | 9/2000 | Martinez et al. |
| 6,128,740 A | 10/2000 | Curry et al. |
| 6,161,139 A | 12/2000 | Win et al. |
| 6,185,587 B1 | 2/2001 | Bernardo et al. |
| 6,185,683 B1 | 2/2001 | Ginter et al. |
| 6,199,052 B1 | 3/2001 | Mitty et al. |
| 6,210,276 B1 | 4/2001 | Mullins |
| 6,237,096 B1 | 5/2001 | Bisbee et al. |
| 6,289,460 B1 | 9/2001 | Hajmiragha |
| 6,321,333 B1 | 11/2001 | Murray |
| 6,327,656 B2 | 12/2001 | Zabetian |
| 6,367,010 B1 | 4/2002 | Venkatram et al. |
| 6,367,013 B1 | 4/2002 | Bisbee et al. |
| 6,446,115 B2 | 9/2002 | Powers |
| 6,470,448 B1 | 10/2002 | Kuroda et al. |
| 6,584,466 B1 | 6/2003 | Serbinis et al. |
| 6,615,348 B1 | 9/2003 | Gibbs |
| 6,658,403 B1 | 12/2003 | Kuroda et al. |
| 6,671,805 B1 | 12/2003 | Brown et al. |
| 6,728,762 B1 | 4/2004 | Estrada et al. |
| 6,751,632 B1 | 6/2004 | Petrogiannis |
| 6,754,829 B1 | 6/2004 | Butt et al. |
| 6,796,489 B2 | 9/2004 | Slater et al. |
| 6,807,633 B1 | 10/2004 | Pavlik |
| 6,829,635 B1 | 12/2004 | Townshend |
| 6,912,660 B1 | 6/2005 | Petrogiannis |
| 6,931,420 B1 | 8/2005 | Silvester et al. |
| 6,938,157 B2 | 8/2005 | Kaplan |
| 6,944,648 B2 | 9/2005 | Cochran et al. |
| 6,947,911 B1 | 9/2005 | Moritsu et al. |
| 6,959,382 B1 * | 10/2005 | Kinnis et al. ............... 713/170 |
| 6,961,854 B2 | 11/2005 | Serret-Avila et al. |
| 6,973,569 B1 | 12/2005 | Anderson et al. |
| 6,990,684 B2 | 1/2006 | Futamura et al. |
| 7,039,805 B1 * | 5/2006 | Messing ...................... 713/170 |
| 7,059,516 B2 | 6/2006 | Matsuyama et al. |
| 7,069,443 B2 | 6/2006 | Berringer et al. |
| 7,093,130 B1 | 8/2006 | Kobayashi et al. |
| 7,100,045 B2 | 8/2006 | Yamada et al. |
| 7,103,778 B2 | 9/2006 | Kon et al. |
| 7,162,635 B2 | 1/2007 | Bisbee et al. |
| 7,167,844 B1 | 1/2007 | Leong et al. |
| 7,197,644 B2 | 3/2007 | Brewington |
| 7,237,114 B1 | 6/2007 | Rosenberg |
| 7,340,608 B2 | 3/2008 | Laurie et al. |
| 7,360,079 B2 | 4/2008 | Wall |
| 7,395,436 B1 | 7/2008 | Nemovicher |
| 7,424,543 B2 | 9/2008 | Rice, III |
| 7,437,421 B2 | 10/2008 | Bhogal et al. |
| 7,523,315 B2 | 4/2009 | Hougaard et al. |
| 7,533,268 B1 | 5/2009 | Catorcini et al. |
| 7,554,576 B2 | 6/2009 | Erol et al. |
| 7,562,053 B2 | 7/2009 | Twining et al. |
| 7,568,101 B1 | 7/2009 | Catorcini et al. |
| 7,568,104 B2 * | 7/2009 | Berryman et al. ........... 713/176 |
| 7,581,105 B2 | 8/2009 | Dietl |
| 7,657,832 B1 * | 2/2010 | Lin .............................. 715/234 |
| 7,660,863 B2 | 2/2010 | Boursetty et al. |
| 7,788,259 B2 | 8/2010 | Patterson et al. |
| 7,934,098 B1 * | 4/2011 | Hahn et al. ................. 713/176 |
| 7,953,977 B2 | 5/2011 | Maruyama et al. |
| 8,103,867 B2 | 1/2012 | Spitz |
| 8,132,013 B2 * | 3/2012 | Meier ........................... 713/176 |
| 8,286,071 B1 * | 10/2012 | Zimmerman et al. ........ 715/205 |
| 8,588,483 B2 | 11/2013 | Hicks et al. |
| 8,612,349 B1 | 12/2013 | Ledder et al. |
| 2001/0018739 A1 | 8/2001 | Anderson et al. |
| 2001/0034739 A1 | 10/2001 | Anecki et al. |
| 2001/0034835 A1 | 10/2001 | Smith |
| 2002/0004800 A1 | 1/2002 | Kikuta et al. |
| 2002/0019937 A1 | 2/2002 | Edstrom et al. |
| 2002/0026427 A1 | 2/2002 | Kon et al. |
| 2002/0026582 A1 | 2/2002 | Futamura et al. |
| 2002/0040431 A1 | 4/2002 | Kato et al. |
| 2002/0069179 A1 | 6/2002 | Slater et al. |
| 2002/0069358 A1 | 6/2002 | Silvester |
| 2002/0129056 A1 | 9/2002 | Conant et al. |
| 2002/0138445 A1 | 9/2002 | Laage et al. |
| 2002/0143711 A1 | 10/2002 | Nassiri |
| 2002/0162000 A1 * | 10/2002 | Benzler ........................ 713/170 |
| 2002/0178187 A1 * | 11/2002 | Rasmussen et al. .......... 707/513 |
| 2002/0184485 A1 | 12/2002 | Dray et al. |
| 2002/0194219 A1 | 12/2002 | Bradley et al. |
| 2002/0196478 A1 | 12/2002 | Struble |
| 2003/0048301 A1 | 3/2003 | Menninger |
| 2003/0051016 A1 | 3/2003 | Miyoshi et al. |
| 2003/0078880 A1 * | 4/2003 | Alley et al. ..................... 705/38 |
| 2003/0120553 A1 | 6/2003 | Williams |
| 2003/0120930 A1 | 6/2003 | Simpson et al. |
| 2003/0131073 A1 | 7/2003 | Lucovsky et al. |
| 2003/0140252 A1 | 7/2003 | Lafon et al. |
| 2003/0217275 A1 * | 11/2003 | Bentley et al. ............... 713/184 |
| 2004/0054606 A1 | 3/2004 | Broerman |
| 2004/0078337 A1 | 4/2004 | King et al. |
| 2004/0107352 A1 | 6/2004 | Yui et al. |
| 2004/0117627 A1 | 6/2004 | Brewington |
| 2004/0133493 A1 | 7/2004 | Ford et al. |
| 2004/0181756 A1 * | 9/2004 | Berringer et al. ............ 715/530 |
| 2004/0225884 A1 | 11/2004 | Lorenzini et al. |
| 2004/0230891 A1 | 11/2004 | Pravetz et al. |
| 2004/0250070 A1 | 12/2004 | Wong |
| 2004/0255114 A1 | 12/2004 | Lee et al. |
| 2004/0255127 A1 | 12/2004 | Arnouse |
| 2005/0033811 A1 * | 2/2005 | Bhogal et al. ................ 709/206 |
| 2005/0049903 A1 | 3/2005 | Raja |
| 2005/0076215 A1 | 4/2005 | Dryer |
| 2005/0091143 A1 | 4/2005 | Schmidt et al. |
| 2005/0120217 A1 * | 6/2005 | Fifield et al. ................. 713/176 |
| 2005/0165626 A1 | 7/2005 | Karpf |
| 2005/0182684 A1 * | 8/2005 | Dawson et al. ................. 705/26 |
| 2005/0182956 A1 | 8/2005 | Ginter et al. |
| 2005/0192908 A1 | 9/2005 | Jorimann et al. |
| 2005/0231738 A1 * | 10/2005 | Huff et al. ...................... 358/1.1 |
| 2006/0047600 A1 | 3/2006 | Bodenheim et al. |
| 2006/0161780 A1 | 7/2006 | Berryman et al. |
| 2006/0161781 A1 * | 7/2006 | Rice et al. .................... 713/176 |
| 2006/0174199 A1 | 8/2006 | Soltis et al. |
| 2006/0205476 A1 | 9/2006 | Jubinville |
| 2006/0259440 A1 | 11/2006 | Leake et al. |
| 2006/0261545 A1 | 11/2006 | Rogers |
| 2006/0294152 A1 | 12/2006 | Kawabe et al. |
| 2007/0026927 A1 | 2/2007 | Yaldoo et al. |
| 2007/0079139 A1 * | 4/2007 | Kim .............................. 713/186 |
| 2007/0088958 A1 | 4/2007 | Qa'Im-maqami |
| 2007/0118732 A1 * | 5/2007 | Whitmore .................... 713/155 |
| 2007/0130186 A1 | 6/2007 | Ramsey et al. |
| 2007/0136361 A1 | 6/2007 | Lee et al. |
| 2007/0143085 A1 | 6/2007 | Kimmel |
| 2007/0165865 A1 | 7/2007 | Talvitie |
| 2007/0198533 A1 * | 8/2007 | Foygel et al. ................... 707/10 |
| 2007/0208944 A1 * | 9/2007 | Pavlicic ........................ 713/176 |
| 2007/0220260 A1 * | 9/2007 | King ............................. 713/176 |
| 2007/0271592 A1 | 11/2007 | Noda et al. |
| 2007/0289022 A1 | 12/2007 | Wittkotter |
| 2008/0016357 A1 | 1/2008 | Suarez |
| 2008/0034213 A1 * | 2/2008 | Boemker et al. ............. 713/176 |
| 2008/0097777 A1 | 4/2008 | Rielo |
| 2008/0141033 A1 | 6/2008 | Ginter et al. |
| 2008/0209313 A1 | 8/2008 | Gonser |
| 2008/0209516 A1 | 8/2008 | Nassiri |
| 2008/0216147 A1 | 9/2008 | Duffy |
| 2008/0235577 A1 | 9/2008 | Veluchamy et al. |

(56) References Cited

U.S. PATENT DOCUMENTS

| | | |
|---|---|---|
| 2008/0260287 A1 | 10/2008 | Berryman et al. |
| 2008/0313723 A1 | 12/2008 | Naono et al. |
| 2009/0024912 A1 | 1/2009 | McCabe et al. |
| 2009/0025087 A1 | 1/2009 | Peirson, Jr. et al. |
| 2009/0044019 A1 | 2/2009 | Lee et al. |
| 2009/0099881 A1 | 4/2009 | Hanna et al. |
| 2009/0132351 A1 | 5/2009 | Gibson |
| 2009/0138730 A1 | 5/2009 | Cook et al. |
| 2009/0145958 A1 | 6/2009 | Stoutenburg et al. |
| 2009/0185241 A1 | 7/2009 | Nepomniachtchi |
| 2009/0268903 A1 | 10/2009 | Bojinov et al. |
| 2009/0292786 A1 | 11/2009 | McCabe et al. |
| 2010/0088364 A1 | 4/2010 | Carter et al. |
| 2010/0122094 A1 | 5/2010 | Shima |
| 2010/0153011 A1 | 6/2010 | Obrea et al. |
| 2010/0217987 A1 | 8/2010 | Shevade |
| 2010/0235727 A1 | 9/2010 | Ashton et al. |
| 2010/0274863 A1 | 10/2010 | Foygel et al. |
| 2010/0287260 A1 | 11/2010 | Peterson et al. |
| 2010/0293094 A1 | 11/2010 | Kolkowitz et al. |
| 2011/0093769 A1 | 4/2011 | Dunn et al. |
| 2011/0119165 A1 | 5/2011 | Zee |
| 2011/0126022 A1 | 5/2011 | Sieberer |
| 2011/0238510 A1 | 9/2011 | Rowen et al. |
| 2011/0264907 A1 | 10/2011 | Betz et al. |
| 2011/0314371 A1 | 12/2011 | Peterson et al. |
| 2012/0180135 A1 | 7/2012 | Hodges et al. |
| 2012/0209970 A1 | 8/2012 | Scipioni et al. |
| 2012/0271882 A1 | 10/2012 | Sachdeva et al. |
| 2012/0304265 A1 | 11/2012 | Richter et al. |
| 2013/0019156 A1 | 1/2013 | Gonser et al. |
| 2013/0019289 A1 | 1/2013 | Gonser et al. |
| 2013/0050512 A1 | 2/2013 | Gonser et al. |
| 2013/0067243 A1 | 3/2013 | Tamayo-Rios et al. |
| 2013/0159720 A1 | 6/2013 | Gonser et al. |
| 2013/0179676 A1 | 7/2013 | Hamid |
| 2013/0254111 A1 | 9/2013 | Gonser et al. |
| 2013/0263283 A1 | 10/2013 | Peterson et al. |
| 2014/0019761 A1 | 1/2014 | Shapiro |

FOREIGN PATENT DOCUMENTS

| | | |
|---|---|---|
| JP | 2000048072 | 2/2000 |
| JP | 2003271529 | 9/2003 |
| JP | 2005267438 | 9/2005 |
| JP | 2008117258 | 5/2008 |
| JP | 2008225527 | 9/2008 |
| KR | 20000049674 | 8/2000 |
| KR | 1020020092595 | 12/2002 |
| KR | 1020070059931 | 6/2007 |
| KR | 100929488 | 12/2009 |
| KR | 20090122657 | 12/2009 |
| RU | 2400811 | 11/2005 |
| RU | 2291491 | 10/2007 |
| RU | 2300844 | 6/2010 |
| WO | 9607156 | 3/1996 |
| WO | 03091834 | 11/2003 |
| WO | 2007075235 | 7/2007 |
| WO | 2008124627 | 10/2008 |
| WO | 2009012478 | 1/2009 |
| WO | 2010105262 | 9/2010 |

OTHER PUBLICATIONS

Borozdin, "DocuSign Connect Service Guide," DocuSign, Inc., pp. 1-9, 2008.

"eLynx Adds Workflow Management to Electronic Document Platform—new Workflow Capabilities Provide for Enhanced Electronic Loan Processing," eLynx, http://www.elynx.com/news/view/82, 2 pp., Jan. 2009.

Harold, Elliotte Rusty, XML Bible. IDG Books Worldwide, Inc., 1999, p. 191-192.

Kamara et al., "Cryptographic Cloud Storage", 2010, Financial Cryptography and Data Security, p. 136-149.

Zefferer et al., "An Electronic-Signature Based Circular Resolution Database System," Mar. 2010, ACM, p. 1840-1845.

Laurens Leurs; The history of PDF; Feb. 14, 2010; Prepressure.com; pp. 1-12.

Brown, "Digital Signatures: Can They be Accepted as Legal Signatures in EID?", Dec. 1993, ACM, p. 86-92.

Herzberg et al., "Surf'N'Sign: Client Signatures on Web Documents", 1998, IEEE, vol. 37 Issue 1, p. 61-71.

Kwok et al., "An Automatic Electronic Contract Document Signing System in a Secure Environment", 2005, IEEE, p. 497-502.

Su et al., "Signature-In-Signature Verification Via a Secure Simple Network Protocol", 2010, IEEE, p. 1-4.

* cited by examiner

US 8,949,706 B2

SYSTEMS AND METHODS FOR DISTRIBUTED ELECTRONIC SIGNATURE DOCUMENTS

PRIORITY CLAIM

This application claims priority to and the benefit of the filing date of U.S. Provisional Application Ser. No. 60/950,563 filed Jul. 18, 2007, which is herein incorporated by reference in its entirety.

BACKGROUND OF THE INVENTION

Email is a popular way of transferring contract documents in the marketplace. Currently, there does not exist an effective system or method for a person to email a document or file to another person and have them fill-in and sign the document in such a way as to enforce a legally binding electronic signature process.

In order to create a legally binding document, the signer must be authenticated, the document may not be modified and the sequence of signing must be controlled. Standard email systems lack the control over any of these processes. One current method is emailing a PKI signed document. A PKI signed document can be cumbersome because it requires the document to be signed by the sender before it is distributed, then again by the signer when they sign the document, and further requires all parties to have special software and certificates to execute the process. This requirement that all parties pre-establish proper technology in order execute a transaction adds extra burden and cost on both parties to the transaction, which severely limits acceptance of PKI in the marketplace.

Advanced electronic signature services such as DocuSign enable contracts to be signed with an esign-compliant signature process. However, this service lacks the ability to simply email the source document to a person to sign; it requires the signer to visit and authenticate before they sign the document. It further requires the sender to register each document with the service prior to sending it for signature.

SUMMARY OF THE INVENTION

A system and method for distributed electronic signature documents includes creating a signing template that contains information about how a signable document is to be signed, where the signatures are to be placed, who is to sign, and all activities that will be required to complete the transaction. A signable document is created and is then distributed by any means to a signer for signing. The signer opens the signable document, provides any data being requested should the document have form fields, and initiates the signing process. When initiated, a secure message is sent to a web signing server to invoke the signing process. This process preferably validates the request for a signing and then, if valid, executes the signing process as defined by the signing template.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Systems and methods for distributed electronic signature documents are disclosed herein. One embodiment of the present invention acts like a "Self Addressed Stamped Envelope" and allows a document to be sent for signature via email. Once the signer receives the document, he/she may fill in necessary fields prior to signing. When the signer is ready to sign, a control embedded in the document enables the signing process to be initiated and the signing managed by a web service. The web service authenticates the signer and ensures that the content of the contract can/cannot be modified (determined by the creator of the document). The service preferably enforces the workflow and sequencing of the document and adds any fields to the document that the signer added during review and execution. This approach allows any document to be distributed freely for signature via any means along with the ability to be electronically signed without the need for special software or certificates, and there is no requirement for the sender to take specific actions for each document, but rather allow the document to be distributed freely. In a preferred embodiment, the same signable document may be sent to hundreds of recipients via email, each of which may sign their copy, with the result being that all signed copies and all the data provided by the signed copies is securely captured and available to the sender.

Figure 1:
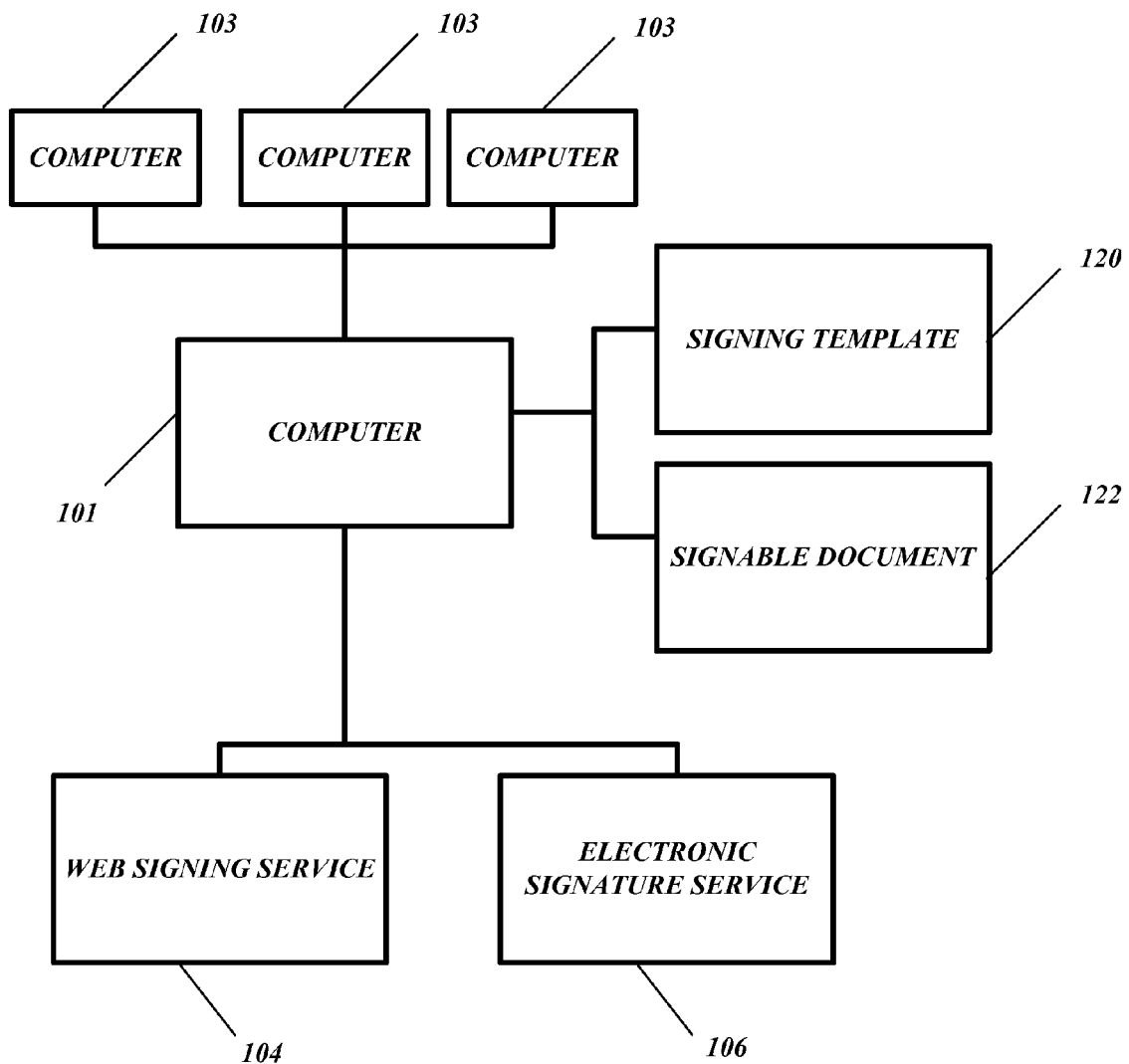
FIG. 1 shows an example system for creation, processing and execution of distributed electronic signature documents.

FIG. 1 shows an example system 100 for creation, processing and execution of distributed electronic signature documents. The system 100 includes a single computer 101, or includes a computer 101 in communication with pluralities of other computers 103. The computer 101 is connected with a web signing service 104 and an electronic signature service 106 over a network such as the Internet. In one embodiment, a bank of servers, a wireless device, a cellular telephone and/or other data capture/entry device can be used in place of the computer 101. An application program is run by the computer 101, which then creates a signing template 120 and/or a signable document 122. The computer 101 can include an application program that allows the signing template 120 and/or the signable document 122 to be sent for signature via email.

The signing template 120 is a file that preferably contains information about the signing process, locations, sequence and authentication. It contains linkages to any form fields in the signable document that will be used to fully execute the signing template. It may also contain information about the account holder and any limitations on the signing process. It may identify other parties that will also sign, as well as any authentication requirements for any of the signers. The signable document 122 is a document file that preferably contains text and/or graphics along with a customizable control or link back to the signing template for execution. The web signing server 104 is a web server on the Internet that preferably hosts the application logic to correlate data transmitted by the embedded control in the signable document 122 with signing template 120 rule sets. An electronic signature service 106, such as the existing DocuSign service, executes the signing template instructions through the web signing server.

Figure 2:
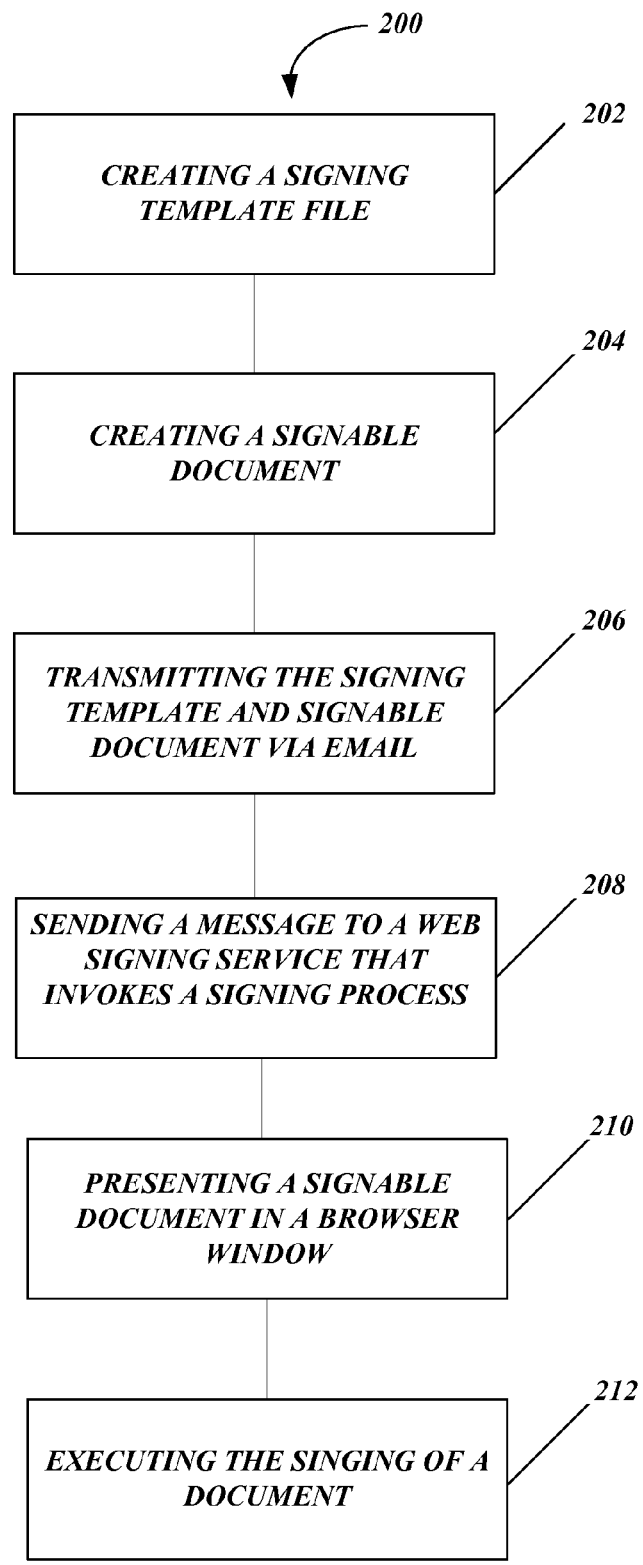
FIG. 2 shows a preferred method for distributed electronic signature documents.

FIG. 2 shows a method for distributed electronic signature documents 200 in one embodiment. At block 202 a document originator creates a signing template file that contains information about how a signable document is to be signed. A document originator may be a user, a party to a transaction, an agency or any entity interested in creating a signable document. The signing template file may include but is not limited to the location of signatures and initials for one or more signers; linkage between form fields in the actual document; information to be used to notify or authenticate the signer; information that may be used by decision systems to decide on different signature execution processes based on what is entered into the document during the signing process; the number of times the signable document can be executed; who will pay for the signature process; information governing whether the signable document content is modifiable by the signer; and other controlling information that may be changed or modified at any time by the sender who has access to it on the web server connected to the Internet. The signing template is preferably stored on a web signing server that is connected to the Internet.

In one embodiment, at block 204, the document originator may create a signable document that is to be distributed to recipients for signing or viewing. The creation of the signing template and signable document preferably occurs in the same application, but may also occur in a different sequence and in different applications. The core signable document preferably includes an embedded control that provides information about the companion signing template. This information is similar to a secure hyperlink that enables the signer to click a button ("SDButton") or a link in the signable document that contains information about how to connect over the Internet to the signing template for processing. The signable document is preferably paired with a signing template; however, there may be multiple signable documents relating back to one or more Signable Templates.

The document originator, at block 206, transmits electronically the signing template and signable document to the signer. In an alternative embodiment, the signing template may be distributed via a simple hyperlink back to the signable document stored on a web server available to the Internet. When the signer is ready and when the SDButton is activated, at block 208, a message is sent to the signing template on the web signing server, which invokes a signing process. This signing process preferably launches a procedure that validates the transaction and uploads the data provided by any form fields in the signable document to the web signing server and invokes a signing process that spawns a local web browser on the signer's computer and begins a signing process as defined by the signing template.

After the signer has been authenticated by the system by any means defined in the signing template, at block 210 a version of the signable document that is created from the server is presented in the browser window. The signing process uses the current method of signing found in the DocuSign service, but may accommodate alternative methods of signing found in similar services. At block 212, the signer signs the document.

Preferably only the form field data from the signer is uploaded to the server and merged into the signing template (which contains the signable document copy). In this embodiment, the signers are not able to modify the underlying documents because this data is not used when the contract is presented to them during the signing process.

In an alternative embodiment, if the sender allows the content to be modified prior to submitting to the web signing server for signing, the entire signable document rather than only the field information is uploaded to the web signing server for handling through the signing process. In this embodiment, the modified document is displayed for the signer to sign in the web signing server.

In another embodiment, the sender does not allow the content to be modified and the entire document is posted to the web signing server for the signing process. Next, a document integrity validation occurs on the posted document to ensure that the underlying content has not been changed.

Once a signable document/signing template pairing has been created, the signable document can be used in many different ways to enable businesses to easily allow electronic signatures to be collected. The following provide non-limiting examples of alternative embodiments as may be desired or dictated by application requirements.

In one example, a business creates a signable document for the company 401k signing sheet and emails it to multiple employees. Each employee opens the file and fills in the form, clicking a button that may say "Sign." The web signing server responds by presenting a web interface that authenticates and presents the document for signature for each employee and collects the signature and any data provided.

In another example, a business creates a signable document for a sales order form and creates the companion signing template, which requests that after the original signer has signed the document must be countersigned internally by two other people before being completed. To execute a sales transaction, the sales representative opens the document, enters in the data required for the sale, and sends the file to the signer for signature. The signer merely clicks the "Sign" button. The web signing server responds by presenting a web interface that authenticates and provides the document for signature to the first signer. Once the first signer has signed, the document is routed to the other two signers for signatures before it is completed.

A business creates a signable document that is unlocked (i.e. the content is changeable) for the company consulting agreement, and a signing template with instructions about the signing process, which ensures the company signer signs second. This contract is edited by both the company and consultant several times before it is deemed to be the final copy. Once the final copy is reached, either party may click the "Submit for Signature" link or button and the web signing server manages the signing process.

A company has an "Account Setup Form" that currently prospects download, print and fill out manually, and faxing the form back to the company for account setup. Using the systems and methods described herein, the sender company creates the form as a signable document linked to a signing template that defines the signing process for opening an account. When the user clicks on a hyperlink on a web page that says "Open Account," the form is displayed in the browser window, and the user fills out the form using all form fields defined in the signable document (for example a PDF form). When the user clicks "Sign" the web signing server executes the signing process for the document.

While the preferred embodiment of the invention has been illustrated and described, as noted above, many changes can be made without departing from the spirit and scope of the invention. Accordingly, the scope of the invention is not limited by the disclosure of the preferred embodiment, but to the invention as described above and illustrated in the exemplars shown below.

The embodiments of the invention in which an exclusive property or privilege is claimed are defined as follows:

1. A method for distributed electronic signature documents comprising:
   creating and storing on a signing server a signing template that contains information about how a signable document is to be signed, the information specifying locations in the signable document of signatures of one or more signers;

creating a signable document to be distributed to a signer for signing, wherein the signable document is a document file that includes form fields and an activatable control that references the signing template stored on a web signing server;

electronically transmitting the signable document to the signer;

sending a message using the activatable control in the signing document to a web signing server to invoke a signing process defined by the signing template; and executing the signing process by receiving data entered by the signer into the form fields of the document file and merging the received data into the signing template, wherein the signing template is separate from the signable document, and wherein the signing template and the signable document reference one another, and wherein the information in the template further includes:
  information specifying linkage between form fields in the signable document;
  a number of times the signable document can be executed;
  information identifying who will pay for the signature process; and
  information governing whether the signable document content is modifiable by each of the signers.

2. The method of claim 1 further comprising enabling a signer to fill in fields prior to signing.

3. The method of claim 1 further comprising creating an activatable control in the signable document that initiates the signing process.

4. The method of claim 1 further comprising authenticating a user when logging into the web signing server.

5. The method of claim 1 further comprising locking the content of a contract such that it cannot be modified.

6. The method of claim 1 further comprising prompting a user to make changes to a contract as necessary.

7. The method of claim 1 further comprising enforcing workflow and sequencing of a document at the web signing server.

8. The method of claim 7 wherein enforcing the workflow includes, in response to receiving a signature from the signer, automatically routing the document to additional signers.

9. The method of claim 7 wherein enforcing the workflow includes assuring that multiple signers sign the signable document in a specified order.

10. The method of claim 1, further comprising in response to a sender allowing content of the signable document be modified prior to submitting to the web signing server for signing, uploading the entire signable document to the web signing server for handling through the signing process rather than uploading only the data entered by the signer into the form fields.

11. A system for distributed electronic signature documents, comprising
  a display;
  a memory configured to store document information;
  a processor in data communication with the display and the memory, the memory further comprising:
    a first component configured to create a signing template, the signing template configured to contain information about how a signable document is to be signed, the information specifying locations in the signable document of signatures of one or more signers;
    a second component configured to create a signable document, wherein the signable document is a document file that includes contractual text, form fields, and an activatable control that references the signing template;
  a web signing server in communication with the processor and further configured to store the signing template and host application logic to correlate data between the signable document and the signing template; and
  an electronic signature service configured to:
    execute a signing process defined by the signing template through the web signing server; and
    receive data entered by the signer into the form fields of the document file and merge the received data into the signing template,
  wherein the signing template is separate from the signable document, and wherein the signing template and the signable document reference one another, and
  wherein the information in the template further includes:
    information specifying linkage between form fields in the signable document;
    a number of times the signable document can be executed;
    information identifying who will pay for the signature process; and
    information governing whether the signable document content is modifiable by each of the signers.

12. The system of claim 11 further comprising a third component configured to enable a signer to fill in fields prior to signing.

13. The system of claim 11 further comprising a third component configured to create an activatable control in the signable document that initiates the signing process.

14. The system of claim 11 further comprising a third component configured to enforce workflow and sequencing of a document at the web signing server.

15. The system of claim 11, wherein the information in the template further includes information used by decision systems to decide on different signature execution processes based on what is entered into the signable document during the signing process.

16. The system of claim 11, wherein the information in the template further includes:
  information specifying linkage between form fields in the signable document; and
  information governing whether the signable document content is modifiable by each of the signers.

17. A non-transitory computer readable medium stored with a program for causing a computer to function as a distributor of electronic signature documents following a series of steps comprising:
  creating a signing template that contains information about how a signable document is to be signed, the information specifying locations in the signable document of signatures of one or more signers;
  creating a signable document to be distributed to a signer for signing, wherein the signable document is a document file that includes form fields and an activatable control that references the signing template stored on a web signing server;
  electronically transmitting the signable document to the signer;
  sending a message using the activatable control in the signing document to a web signing server to invoke a signing process defined by the signing template; and executing the signing process by receiving data entered by the signer into the form fields of the document file and merging the received data into the signing template, wherein the signing template is separate from the signable document, and wherein the signing template and the signable document reference one another, and wherein the information in the template further includes:
- information specifying linkage between form fields in the signable document;
- a number of times the signable document can be executed;
- information identifying who will pay for the signature process; and
- information governing whether the signable document content is modifiable by each of the signers.

18. The computer readable medium of claim 17 further comprising enabling a signer to fill in fields prior to signing.

19. The computer readable medium of claim 17 further comprising creating an activatable control in the signable document that initiates the signing process.

* * * * *